United States Patent
Absar et al.

(10) Patent No.: US 6,591,241 B1
(45) Date of Patent: Jul. 8, 2003

(54) SELECTING A COUPLING SCHEME FOR EACH SUBBAND FOR ESTIMATION OF COUPLING PARAMETERS IN A TRANSFORM CODER FOR HIGH QUALITY AUDIO

(75) Inventors: Mohammed Javed Absar, Singapore (SG); Sapna George, Singapore (SG); Antonio Mario Alvarez-Tinoco, Singapore (SG)

(73) Assignee: STMicroelectronics Asia Pacific PTE Limited, Singapore (SG)

( * ) Notice: Subject to any disclaimer, the term of this patent is extended or adjusted under 35 U.S.C. 154(b) by 0 days.

(21) Appl. No.: 09/582,552

(22) PCT Filed: Dec. 27, 1997

(86) PCT No.: PCT/SG97/00076
§ 371 (c)(1),
(2), (4) Date: Sep. 8, 2000

(87) PCT Pub. No.: WO99/34527
PCT Pub. Date: Jul. 8, 1999

(51) Int. Cl.[7] ............ G10L 19/02; H04B 1/66; H04S 1/00
(52) U.S. Cl. ............ 704/504; 704/200.1; 704/205; 704/229
(58) Field of Search ............ 704/200.1, 205, 704/229, 504

(56) References Cited

U.S. PATENT DOCUMENTS

| | | | | |
|---|---|---|---|---|
| 5,481,614 A | * | 1/1996 | Johnston | 381/2 |
| 5,491,773 A | * | 2/1996 | Veldhuis et al. | 704/229 |
| 5,539,829 A | * | 7/1996 | Lokhoff et al. | 381/2 |
| 5,606,618 A | * | 2/1997 | Lokhoff et al. | 381/2 |
| 5,621,855 A | * | 4/1997 | Veldhuis et al. | 704/229 |
| 5,632,005 A | * | 5/1997 | Davis et al. | 704/504 |
| 5,636,324 A | * | 6/1997 | Teh et al. | 704/226 |
| 5,703,999 A | * | 12/1997 | Herre et al. | 704/203 |
| 5,812,672 A | * | 9/1998 | Herre et al. | 381/2 |
| 5,812,971 A | * | 9/1998 | Herre et al. | 704/230 |
| 5,850,418 A | * | 12/1998 | Van De Kerkhof | 375/240 |
| 5,873,065 A | * | 2/1999 | Akagiri et al. | 704/500 |
| 5,909,664 A | * | 6/1999 | Davis et al. | 704/229 |
| 5,956,674 A | * | 9/1999 | Smyth et al. | 704/229 |
| 5,974,380 A | * | 10/1999 | Smyth et al. | 704/229 |
| 6,341,165 B1 | * | 1/2002 | Gbur et al. | 381/23 |

FOREIGN PATENT DOCUMENTS

EP    0 563 832 A1   * 10/1993    ............ H04H/5/00

OTHER PUBLICATIONS

Advanced Television Systems Committee (ATSC), Digital Audio Compression (AC-3) Standard, Doc. A/52, Dec. 20, 1995, pp. 1–130.*

Steve Vernon, "Design and Implementation of AC-3 Coders," IEEE Trans. Consumer Electronics, vol. 41, No. 3, Aug. 1995, pp. 754–759.*

Vernon, S., "Design and Implementation of AC-3 Coders," IEEE Trans. on Consumer Electronics, 41(3):754–759, Aug. 1995.

Mckinneey, "Digital Audio Compression Standard AC-3," Advanced Television Systems Committee, pp. 1–130, Dec. 20, 1995, XP002075746.

* cited by examiner

*Primary Examiner*—Tālivaldis Ivars Šmits
(74) *Attorney, Agent, or Firm*—Lisa K. Jorgenson; E. Russell Tarleton; SEED IP Law Group PLLC

(57) ABSTRACT

A method and apparatus for determining parameters for coupling of channels in a digital audio encoder. A frequency range of two audio channels is coupled together in a coupling channel, and a systematic method of determining optimum coupling parameters is employed. Sub-bands of the channels are processed individually, and a measure of the power of each sub-band is used to determine a coupling coefficient generation scheme for each individual sub-band. Adjacent ones of the sub-bands using the same coupling scheme are combined to form bands in the coupling channel, which dictate the generation of the coupling coordinates for the audio channels. The arrangement of the sub-bands in bands also facilitates the generation of phase flags for each band, on the basis of the coupling scheme used in the band.

20 Claims, 5 Drawing Sheets

SELECTING A COUPLING SCHEME FOR EACH SUBBAND FOR ESTIMATION OF COUPLING PARAMETERS IN A TRANSFORM CODER FOR HIGH QUALITY AUDIO

RELATED APPLICATIONS

This application is related to concurrently filed allowed copending patent application Ser. No. 09/581,779, which is a national stage entry of application PCT/SG97/00075, METHOD AND APPARATUS FOR PHASE ESTIMATION IN A TRANSFORM CODER FOR HIGH QUALITY AUDIO, filed Dec. 19, 1997.

TECHNICAL FIELD

This invention relates in general to digital signal processing of audio signals, such as music signals. More particularly, the invention relates to the implementation of a high quality dual-channel digital audio encoder, based on the psychoacoustic model of the human auditory system, for digital storage or transmission.

BACKGROUND ART

In order to more efficiently broadcast or record audio signals, the amount of information required to represent the audio signals may be reduced. In the case of digital audio signals, the amount of digital information needed to accurately reproduce the original pulse code modulation (PCM) samples may be reduced by applying a digital compression algorithm, resulting in a digitally compressed representation of the original signal. The goal of the digital compression algorithm is to produce a digital representation of an audio signal which, when decoded and reproduced, sounds the same as the original signal, while using a minimum of digital information for the compressed or encoded representation.

Recently, the use of psychoacoustic models in the design of audio coders has led to high compression ratios while keeping audible degradation in the compressed signal to a minimum. Description of one such method can be found in the Advanced Television Systems Committee (ATSC) Standard document entitled "Digital Audio Compression (AC-3) Standard", Document A/52, Dec. 20, 1995. In the basic approach, the time domain signal is first converted to frequency domain using a bank of filters. Frequency domain masking of human auditory system is then exploited to maximize perceived fidelity of the signal transmitted at a given bit-rate.

Further compression can be successively obtained by use of a well known technique called coupling. Coupling takes advantage of the way the human ear determines directionality for very high frequency signals, in order to allow a reduction in the amount of data necessary to code an audio signal. At high audio frequency (approximately above 2 kHz) the ear is physically unable to detect individual cycles of an audio waveform, and instead responds to the envelope of the waveform. Consequently, the coder combines the high frequency coefficients of the individual channels to form a common coupling channel. The original channels combined to form the said coupling channel are referred to as coupled channels.

A basic encoder can form the coupling channel by simply taking the average of all the individual channel coefficients. A more sophisticated encoder can alter the sign of individual channels before adding them into the sum so as to avoid phase cancellations.

The generated coupling channel is next sectioned into a number of frequency sub-bands. Frequency sub-bands are grouped together to form coupling bands. For each such band and each coupled channel a coupling co-ordinate is transmitted to the decoder. To obtain the high frequency coefficients in any coupling frequency band, for a particular coupled channel, from the coupling channel, the decoder multiplies the coupling channel coefficients in that coupling frequency band by the coupling co-ordinate of that channel for that particular coupling frequency band. For a dual channel implementation of such a decoder, a phase flag bit may also be provided for each coupled band of the coupling channel. A final step of phase-correction is then performed, by the decoder, in which the coefficients in each band are multiplied by the phase flag bit for that band.

As mentioned, a basic encoder can form the coupling channel by simple addition of all the individual channel coefficients, or a more sophisticated encoder may alter the sign of individual channels before addition in order to reduce phase cancellation effects. But no existing single coupling strategy for the entire frequency spectrum of the coupling channel is adequate to ensure minimal information loss due to phase cancellation. The criteria for combining sub-bands to form larger bands is not well understood and most developers usually use a pre-specified banding structure to group the sub-bands into bands. Phase flag computation is performed as an additional step, thereby requiring extra computation. The standard also does not outline any specific method for determination of the phase flag bits. Ad hoc methods do exist but, due to their very nature, do not guarantee any assured performance, and cannot be relied upon to provide minimum error between the original coefficients at encoder and the reconstructed, phase corrected, coefficients at the decoder.

SUMMARY OF THE INVENTION

In accordance with the disclosed embodiments of the present invention, there is provided a method for computing coupling parameters in a digital audio encoder wherein frequency coefficient sub-bands in a coupling frequency range are arranged into coupling bands, including the steps of determining a power value for each sub-band in the frequency range, selecting a coupling scheme for each sub-band based on the corresponding power value, and grouping adjacent sub-bands having the same selected coupling scheme into coupling bands.

Preferably the first or second coupling scheme is selected for each sub-band according to whether the power value is positive or negative.

Preferably the power valve comprises a correlation computation of frequency coefficients from first and second audio channels.

In one form of the invention each sub-band includes at least one frequency coefficient from each of first and second audio channels, wherein the power value for a particular sub-band is determined by summing the product of corresponding frequency coefficients from the first and second channels.

Advantageously, the method may include determining a phase reconstruction value for each coupling band on the basis of the coupling scheme selected for the sub-bands in that band.

In accordance with another embodiment of the invention, there is also provided a method for generating coupling parameters in a dual channel audio encoder wherein frequency coefficient sub-bands in a coupling frequency range are arranged into coupling bands, each sub-band including at least one frequency coefficient from each of first and second audio channels, including the steps of:

i) receiving frequency transform coefficients for the first and second audio channels;

ii) computing a power value for each sub-band;

iii) for each sub-band, selecting a coupling coefficient generation scheme from first and second schemes on the basis of the computed power value for that sub-band;

iv) for each sub-band, generating a coupling coefficient according to the selected one of the first and second schemes for that sub-band; and v) forming bands from adjacent sub-bands having the same selected scheme.

Preferably the power value comprises a correlation computation of frequency transform coefficients of the first and second channels.

In a preferred implementation, the power value for a said sub-band is computed according to:

$$P=\Sigma_i(a_i*b_i)$$

where

P is the power value, $a_i$ are frequency coefficients from the first audio channel, $b_i$ are frequency coefficients from the second audio channel, and index i corresponds to frequency coefficients extending over the range of the said sub-band.

Preferably, if the power value, P, is greater then zero the coupling coefficients for the sub-band are generated according to:

$$c_i=(a_i+b_i)/2$$

where $c_i$ are the coupling coefficients; and if the power value, P, is less than zero the coupling coefficients for the sub-band are generated according to:

$$c_i=(a_i-b_i)/2.$$

The method may advantageously include generating a phase flag for the coupling band on the basis of the power value or coupling coefficient generation scheme for the sub-bands in that coupling band. In a particular form of the invention the phase flag for a particular coupling band is +1 if the power value, P, for each of the constituent sub-bands is greater than zero, and the phase flag is −1 if the power value, P, for each of the constituent sub-bands is less than zero.

Another embodiment of the invention also provides a dual channel digital audio encoding apparatus wherein audio data frequency coefficients for first and second channels in a coupling frequency range are arranged in a sequence of sub-bands, comprising:

a correlation computation processor for computing a power value for each sub-band;

a coupling coefficient generator for generating a sequence of sub-band coupling coefficients using a coupling coefficient generation scheme selected for each sub-band on the basis of the corresponding power value for that sub-band; and a band structure processor for arranging adjacent coupling coefficient sub-bands in the sequence generated with the same generation scheme into bands.

The audio encoding apparatus preferably includes a phase estimation processor for generating a phase flag for each band on the basis of the generation scheme used for the constituent sub-bands of the corresponding band. The apparatus may further include a coupling coordinate generator for generating coupling coordinates for the first and second channels for each said band.

A sub-band based coupling channel generation strategy can ensure minimal information loss due to phase cancellation of the two coupled channels. The sub-band based coupling strategy may be considered as a generalisation of a channel based strategy. If the coupling strategy remains the same for all bands, the band based coupling strategy is equivalent to the channel based coupling strategy.

Even when exact phase cancellation does not occur, error due to phase cancellation can be noticeably large in cases where an appreciable phase lag exists between the two channels. The methods of the preferred embodiments of this invention use power calculations to minimize signal information loss due to coupling. Further, the coupling strategy of of the sub-bands is used to determine the banding structure. This approach reduces the phase estimation for a band to a simple decision, requiring no extra computation.

BRIEF DESCRIPTION OF THE DRAWINGS

The invention is described in greater detail hereinbelow, by way of example only, through description of an embodiment thereof and with reference to the accompanying drawings, wherein.

DETAILED DESCRIPTION OF THE PREFERRED EMBODIMENTS

Figure 1:
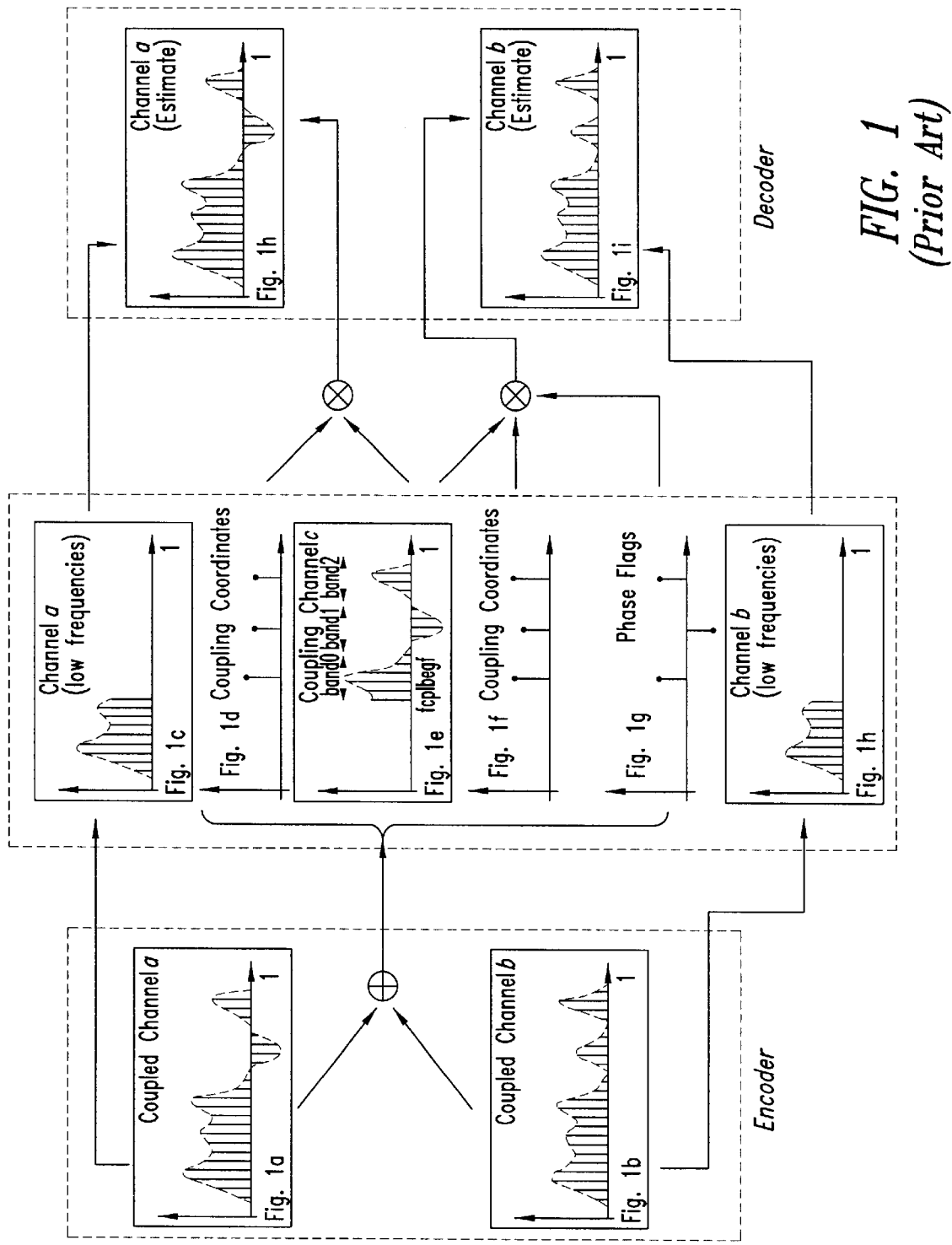
FIG. 1 is a diagrammatic illustration of an audio encoding/decoding process including channel coupling and phase reconstruction.

As mentioned, one method for compression of digital audio signals is described in the ATSC Standard entitled "Digital Audio Compression (AC-3) Standard", (Document A/52, Dec. 20, 1995), and the contents of that document are expressly incorporated herein by reference. The following description of a preferred embodiment of the invention is presented in the context of an audio encoder which is compatible with the AC-3 Standard.

An AC-3 encoder accepts PCM audio and produces an encoded bit stream consistent with the AC-3 standard. The specifics of the audio encoding process are not normative requirements of the standard, but an compatible encoder must produce a bit stream matching the syntax set out in the AC-3 standard document, which, when decoded as specified, produces audio of sufficient quality for the intended application.

The AC-3 algorithm achieves high coding gain (the ratio of the input bit-rate to the output bit-rate) by coarsely quantizing a frequency domain representation of the audio signal. The basic encoding process is as follows. The first step in the encoding process is to transform the representation of audio from a sequence of PCM time samples into a sequence of blocks of frequency coefficients. This is done in the analysis filter bank. Overlapping blocks of 512 time samples are multiplied by a time window and transformed into the frequency domain. Due to the overlapping blocks, each PCM input sample is represented in two sequential transformed blocks. The frequency domain representation may then be decimated by a factor of two so that each block contains 256 frequency coefficients. The individual frequency coefficients are represented in binary exponential notation as a binary exponent and a mantissa. The set of exponents is encoded into a coarse representation of the signal spectrum which is referred to as the spectral envelope. This spectral envelope is used by a core bit allocation routine which determines how many bits to use to encode each individual mantissa. The spectral envelope and the coarsely quantized mantissas for 6 audio blocks (1536 audio samples) are formatted into an AC-3 frame. The AC-3 bit stream is a sequence of AC-3 frames.

Channel coupling is performed during encoding by averaging certain transform coefficients across channels that are included in the coupling channel. Each coupled channel has a unique set of coupling coordinates which are used to preserve the high frequency envelopes of the original channels. The coupling process is performed for transform coefficients corresponding to frequencies above a coupling frequency that is defined by a pre-specified value, cplbegf.

The decoder converts the coupling channel back into individual channels by multiplying the coupled channel transform coefficient values by the coupling coordinate for that channel and frequency sub-band. An additional processing step occurs where only two channels are coupled and phase flag bits are employed. In this case a phase-flag-in-use bit (phsflginu) is set in the encoded bit-stream, and phase restoration bits are retrieved from the bit-stream by the decoder in the form of phase flag bits. The phase flag bits are arranged to represent the coupling sub-bands in a frequency ascending order. If a phase flag bit is set for a particular sub-band, all of the right channel transform coefficients within the coupled sub-band are negated (inverted) after modification by the coupling coordinate, but before inverse transformation.

Transform coefficients #37 through #252 are grouped into 18 sub-bands of 12 coefficients each, as shown below in Table 1. The parameter cplbegf indicates the number of the coupling sub-band which is the first to be included in the coupling process. Below the frequency (or transform coefficient number, tc#) indicated by cplbegf all channels are independently coded. Above the frequency indicated by cplbegf, channels included in the coupling process share the common coupling channel, up to the frequency (or tc#) indicated by a parameter cplbegf The coupling channel is coded up to the frequency (or tc#) indicated by cplendf, which represents the last coupling sub-band which is coded. The parameter cplendf is interpreted by adding 2 to its value, so the last coupling sub-band which is coded can range from 2–17.

| coupling sub-band# | low tc# | high tc# | If cutoff (kHz) @ fs = 48 kHz | If cutoff (kHz) @ fs = 48 kHz | If cutoff (kHz) @ fs = 48 kHz | If cutoff (kHz) @ fs = 48 kHz |
|---|---|---|---|---|---|---|
| 0 | 37 | 48 | 3.42 | 4.55 | 3.14 | 4.18 |
| 1 | 49 | 60 | 4.55 | 5.67 | 4.18 | 5.21 |
| 2 | 61 | 72 | 5.67 | 6.80 | 5.21 | 6.24 |
| 3 | 73 | 84 | 6.80 | 7.92 | 6.24 | 7.28 |
| 4 | 85 | 96 | 7.92 | 9.05 | 7.28 | 8.31 |
| 5 | 97 | 108 | 9.05 | 10.17 | 8.31 | 9.35 |
| 6 | 109 | 120 | 10.17 | 11.30 | 9.35 | 10.38 |
| 7 | 121 | 132 | 11.30 | 12.42 | 10.38 | 11.41 |
| 8 | 133 | 144 | 12.42 | 13.55 | 11.41 | 12.45 |
| 9 | 145 | 156 | 13.55 | 14.67 | 12.45 | 13.48 |
| 10 | 157 | 168 | 14.67 | 15.80 | 13.48 | 14.51 |
| 11 | 169 | 180 | 15.80 | 16.92 | 14.51 | 15.55 |
| 12 | 181 | 192 | 16.92 | 18.05 | 15.55 | 16.58 |
| 13 | 193 | 204 | 18.05 | 19.17 | 16.58 | 17.61 |
| 14 | 205 | 216 | 19.17 | 20.30 | 17.61 | 18.65 |
| 15 | 217 | 228 | 20.30 | 21.42 | 18.65 | 19.68 |
| 16 | 229 | 240 | 21.42 | 22.55 | 19.68 | 20.71 |
| 17 | 241 | 252 | 22.55 | 23.67 | 20.71 | 21.75 |

The coupling channel sub-bands are combined in to coupling bands for which coupling coordinates are generated for each coupled channel (and included in the bit stream). The coupling band structure is indicated by a parameter cplbndstrc[sbnd]. Each bit of the cplbndstrc[ ] array indicates whether the sub-band corresponding to the index is combined into the previous (lower in frequency) coupling band. Coupling bands are thus each structured based on an integral number of coupling channel sub-bands.

FIG. 1 diagrammatically illustrates the general coupling process. In this Figure, the Figure portions 1a to 1i illustrate diagrammatically the various frequency coefficients, coupling coordinates and phase flag values as functions of frequency over a portion of an encoding followed by decoding process. In a dual channel encoder, the input bit stream comprises interleaved digitize signals of two channels, the two individual channels hereinafter being identified as a (left channel) and b (right channel). The first step is to extract a block of the digitized samples, for both channel a and b, from the input stream and transform it to the frequency domain using filter banks, to generate frequency domain coefficients. The general frequency domain coefficients for channels a and b are hereinafter identified as $a_i$ and $b_i$ (see FIGS. 1a and 1b), respectively, where the subscript i identifies the corresponding frequency sub-band of the coefficient.

A frequency point called $f_{cplbegf}$ (coupling begin frequency) is selected by the encoder based on the cplbegf parameter as outlined above. Frequency coefficients $a_i$ and $b_i$, for all i below $f_{cplbegf}$ are sent individually by the encoder into the compressed bit stream (see FIGS. 1c and 1h).

Another frequency point called $f_{cplendf}$ (coupling end frequency) is selected based on a defined parameter cplendf.

Frequency coefficients $a_i$ and $b_i$ for all i above $f_{cplbegf}$ and below $f_{cplendf}$ are combined in a binary operation to generate a coupling channel, c. Channels a and b, which form the coupling channel, are referred to as coupled channels. The coupled channels, thus, share the common coupling channel between $f_{cplbegf}$ and $f_{cplendf}$ (see FIG. 1e). The way in which the coupled channels are combined to form the coupling channel is not specified by the AC-3 standard.

The coupling channel is sectioned into sub-bands, each sub-band generally comprising an equal number of coefficients. For example, coupling channel coefficients $c_i$, for i between $f_{cplbegf}$ and $f_{cplbegf+SBW-1}$, could form the first sub-band, SBW denoting the sub-band width. Coefficients $c_i$, for i between $f_{cplbegf+SBW}$ and $f_{cplbegf+2SBW-1}$, would then form the second sub-band and so on.

Adjacent coupling sub-bands are next combined for form coupling bands (bands 0, 1 and 2 shown in FIG. 1e). Each coupling band may contain one or more coupling sub-bands. Thus, a coupling band width will always be a multiple of SBW. The grouping of sub-bands to form bands is determined at runtime by the encoder. The coupling band structure, sent as a part of the encoded bitstream, indicates to the decoder which coupling sub-bands were combined to form each coupling band. As an example, FIG. 1e shows three bands covering the full coupling channel spectrum.

For each coupling band and each coupled channel, a coupling co-ordinate is sent by the encoder (see FIGS. 1d and 1f). To restore the original channel coefficients $a_i$ or b in a particular band the decoder must multiply each coupling channel coefficient $c_i$ in that band by the coupling-coordinate value for that band and channel (see FIGS. 1d and 1e). For example, if $\psi$ is the coupling co-ordinate for a band in the coupled channel b, the coefficients estimate for b at the decoder, called $\hat{b}_i$, will be $$\hat{b}_i = \psi c_i \qquad \text{Eq. 1}$$

The encoder measures the original signal power in the band for the individual coupled channel, as well as the power in the coupling channel for the same band. The ratio of original signal power within a band to the coupling channel power in the same band is termed as the coupling co-ordinate for the band.

For a dual channel encoder, a phase flag bit is also sent for each coupling band. It indicates whether the decoder should invert the coupling channel coefficients when reconstructing coefficients for coupled channel b.

However, the standard does not specify any unified strategy for coupling channel generation, formulation of coupling band structure, or determination of phase flag for each band. Therefore, embodiments of this invention provide a method for taking these three decisions, based on strong mathematical and practical reasons, with the overall objective being to provide a plan for efficient implementation of a viable encoder using coupling characteristics of audio.

Figure 2A:
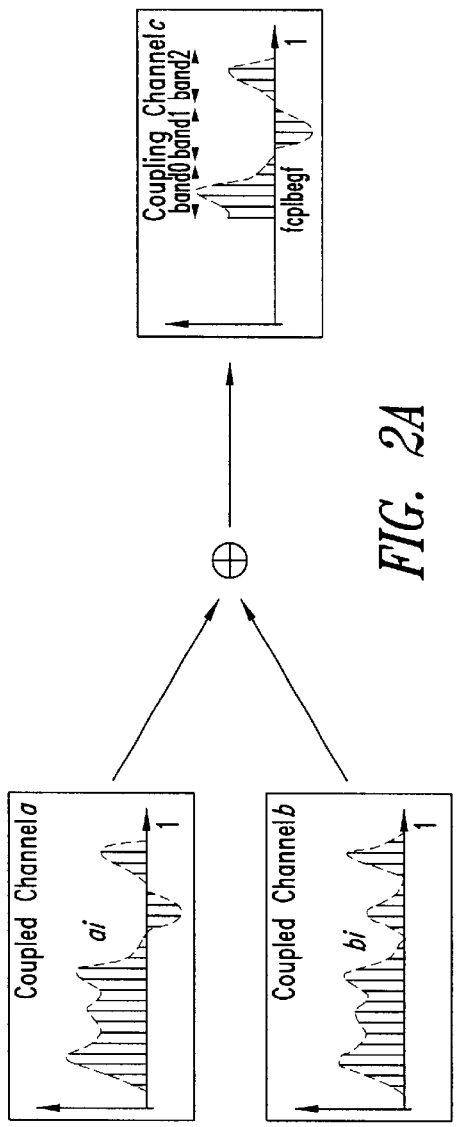
FIGS. 2a and 2b are diagrammatic illustrations of two primary coupling strategies.
Figure 2B:
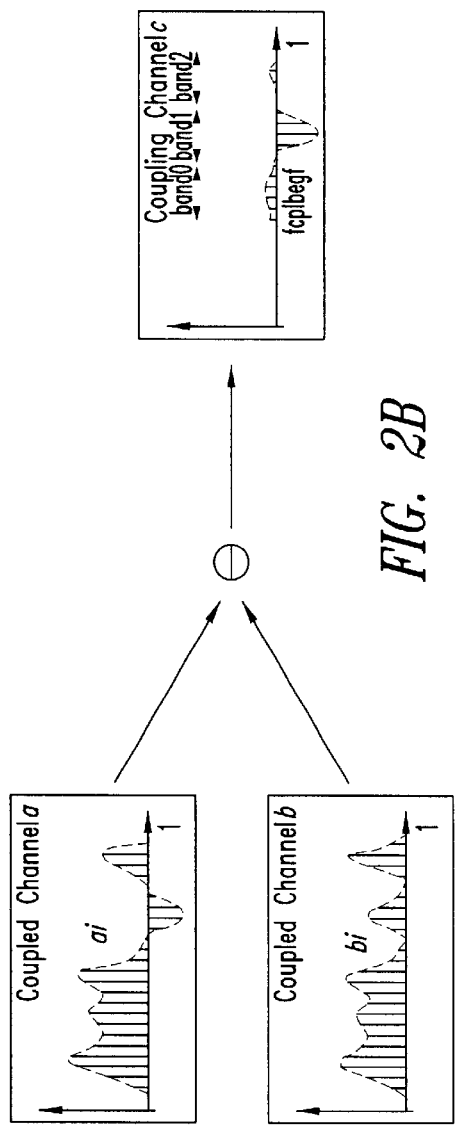

Consider FIG. 2a which shows coupling channel c being generated from a and b by simple addition and scaling, i.e. $c_i = (a_i + b_i)/2$, for i over the entire frequency range $f_{cplbegf}$ to $f_{cplendf}$. It is evident from FIG. 2a that a loss of information will result at some frequencies, which cannot be recovered at any later stage. FIG. 2b preserves On the other hand, by using the coupling strategy, $c_i = (a_i - b_i)/2$, the information lost in the frequency sub-bands of the FIG. 2a strategy can be preserved, but it is evident that information is lost at other frequencies.

Based on this analysis, it is clear that no single coupling channel generation strategy can be adequate for preserving the signal content over the entire frequency range for the coupling channel. Accordingly, embodiments of the present invention utilize a coupling strategy that is formulated at sub-band level to minimize information loss due to phase cancellation.

The two primarily available strategies which are available for generation of coefficients of a coupling channel are illustrated by Eq. 2 and Eq. 3:

$$c_i = (a_i + b_i)/2 \qquad \text{Eq. 2}$$

or $$c_i = (a_i - b_i)/2 \qquad \text{Eq. 3}$$

For each sub-band, the decision of whether Eq. 2 or Eq. 3 should be used as the coupling coefficient generation strategy is taken by computing the power in the resulting coupling sub-band. Consider the first sub-band (sub-band 1). If the resulting power in sub-band 1, by use of coupling strategy of Eq. 2, is greater than the power in the sub-band by use of coupling strategy of Eq. 3, then Eq. 2 is chosen as the coupling strategy for the sub-band. That is, if $$\Sigma_i [(a_i+b_i)/2]^2 > \Sigma_i [(a_i-b_i)/2]^2 \qquad \text{Eq. 4}$$

$$-\Sigma_i a_i * b_i > 0 \qquad \text{Eq. 5}$$

then, Eq. 2 is chosen as the coupling strategy for the corresponding sub-band. The power computation for determining a coupling coefficient generation strategy ensures that signal loss due to phase cancellation does not occur or is minimized at the sub-band level.

The next adjacent sub-band (e.g. sub-band 2 according to the above example) is then analyzed. A similar power calculation is performed on this sub-band to determine the coupling strategy. If the coupling strategy determined for this sub-band is same as the previous one, then this sub-band is combined with the previous one in forming a coupling band. If the coupling strategy for this band is opposite to that of the previous one then a new coupling band is begun, starting with the current sub-band.

In the case that several adjacent sub-bands are computed with the same coupling strategy, an upper limit on coupling band-width can be used. For example, if six adjacent sub-bands have the same coupling strategy, then groups of three can be used to form two bands. This consideration can in some instances be important, since it is possible for all of the coupling co-ordinates to be computed with the same coupling strategy which, without some limit, would result in an extremely large band-width and can cause poor reconstruction of coupling channel coefficients at the decoder. The limit can, in fact, be a function of the frequency level of the sub-bands since the human ear has different responses over different audible frequency ranges.

Where a band is formed using the method described above, for that band the coupling strategy is identical over all its constituent sub-bands. Since, for each sub-band the decision on coupling strategy between the two options of Eq. 2 and Eq. 3 was taken by determining the power in the sub-band, it can be concluded that the total power in the coupling channel band is greater than the power if the other option had been chosen.

For example, suppose sub-band 1, 2 and 3 are combined to form the coupling band 0. Since these sub-bands are grouped into the same band, they must, according to the described method, follow the same coupling strategy.

Assume that Eq. 2 was the coupling strategy for sub-bands 1, 2 and 3. Therefore:

$$\Sigma_i(a_i+b_i)^2 \geq \Sigma_i(a_i-b_i)^2 \text{ for all i in sub-band } \mathbf{1} \quad \text{Eq. 6}$$

$$\Sigma_i(a_i+b_i)^2 \geq \Sigma_i(a_i-b_i)^2 \text{ for all i in sub-band } \mathbf{2} \quad \text{Eq. 7}$$

$$\Sigma_i(a_i+b_i)^2 \geq \Sigma_i(a_i-b_i)^2 \text{ for all i in sub-band } \mathbf{3} \quad \text{Eq. 8}$$

Summing Eq. 6, 7 and 8 obtains:

$$\Sigma_i(a_i+b_i)^2 \geq \Sigma_i(a_i-b_i)^2 \text{ for all i in band } \mathbf{0} \quad \text{Eq. 9}$$

Simplifying Eq. 9 obtains:

$$\Sigma_i(a_ib_i) \geq 0 \text{ for all i in band } \mathbf{0} \quad \text{Eq. 10}$$

The coupling coordinate can then be generated using the known ratio technique: the coupling co-ordinate for a band is the ratio of the power in original coupled channel in the band to the power in the coupling channel for the same band.

Various methods can be utilized to determine the phase flags, and one optimum method for least square error is described in the applicant's copending patent application Ser. No. 09/581,779, entitled "Method and Apparatus for Phase Estimation in a Transform Coder for High Quality Audio", the contents of which are expressly incorporated herein by reference. In summary, the preferred method for phase reconstruction data (phase flag) generation is as follows.

Assume that the frequency coefficients within a particular band are identified as:

$a_i$ for the first coupled channel, $b_i$ for the second coupled channel, $c_i$ for the coupling channel, and index i extends over the frequency range of the band. Then, $$\text{phase\_flag} = \text{sign}(\Sigma(b_i * c_i)) \quad \text{Eq. 11}$$

Note: the sign( ) function has the general interpretation, that is, it returns a +1 if the function parameter is a positive number and −1 if it is negative. For the case of zero, any value, +1 or −1, can be considered as the signals are then, essentially, orthogonal (uncorrelated).

Suppose for a band, the coupling strategy was that of Eq. 2 (as in the previous example of band 0). Then Eq. 10 holds. Substituting the value of $c_i$ from Eq. 2 into Eq. 11 then yields:

$$\text{phase\_flag} = \text{sign}(\Sigma(b_i * (a_i+b_i)/2)) \quad \text{Eq. 12}$$

$$-\text{phase\_flag} = \text{sign}(\Sigma b_i * a_i + \Sigma b_i^2) \quad \text{Eq. 13}$$

The square of a real number is always positive, therefore $\Sigma_i b_i^2 \geq 0$. Using Eq. 10, it follows that the phase flag for this case will be +1. If Eq. 3 had been the coupling strategy, i.e. if Eq. 5 was false, for each sub-band forming the band, the phase flag for the band would then be −1.

To summarize, a coupling strategy is described herein which is formulated at the sub-band level, based on the result of Eq. 5 for each sub-band. This strategy ensures that the coupling does not result in information loss due to phase cancellation. Then, only adjacent coupling sub-bands with identical coupling strategy are grouped together to form coupling bands.

Accordingly, for each coupling band, if Eq. 2 utilized as the coupling strategy for the band, the phase flag for the band can be automatically set to +1. Otherwise, if Eq. 3 was employed as the coupling strategy, then the phase flag for the band should set to −1. This then ensures a least square error between the original channel frequency coefficients at the encoder and the estimated coefficients recovered using the phase flags at the decoder. Therefore, the condition that a band should comprise only those sub-bands with identical coupling strategies not only greatly simplifies the phase estimation but can also be utilized to minimize error due to phase mis-representation.

Upon completion of the whole process for all the bands in the coupling frequency range, the main parameters for the coupling of the channels are fully determined. The computational requirements for the entire process is minimal, especially since all the three operations coupling channel generation determination of banding structure phase flag estimation are combined in one unified approach.

Figure 3:
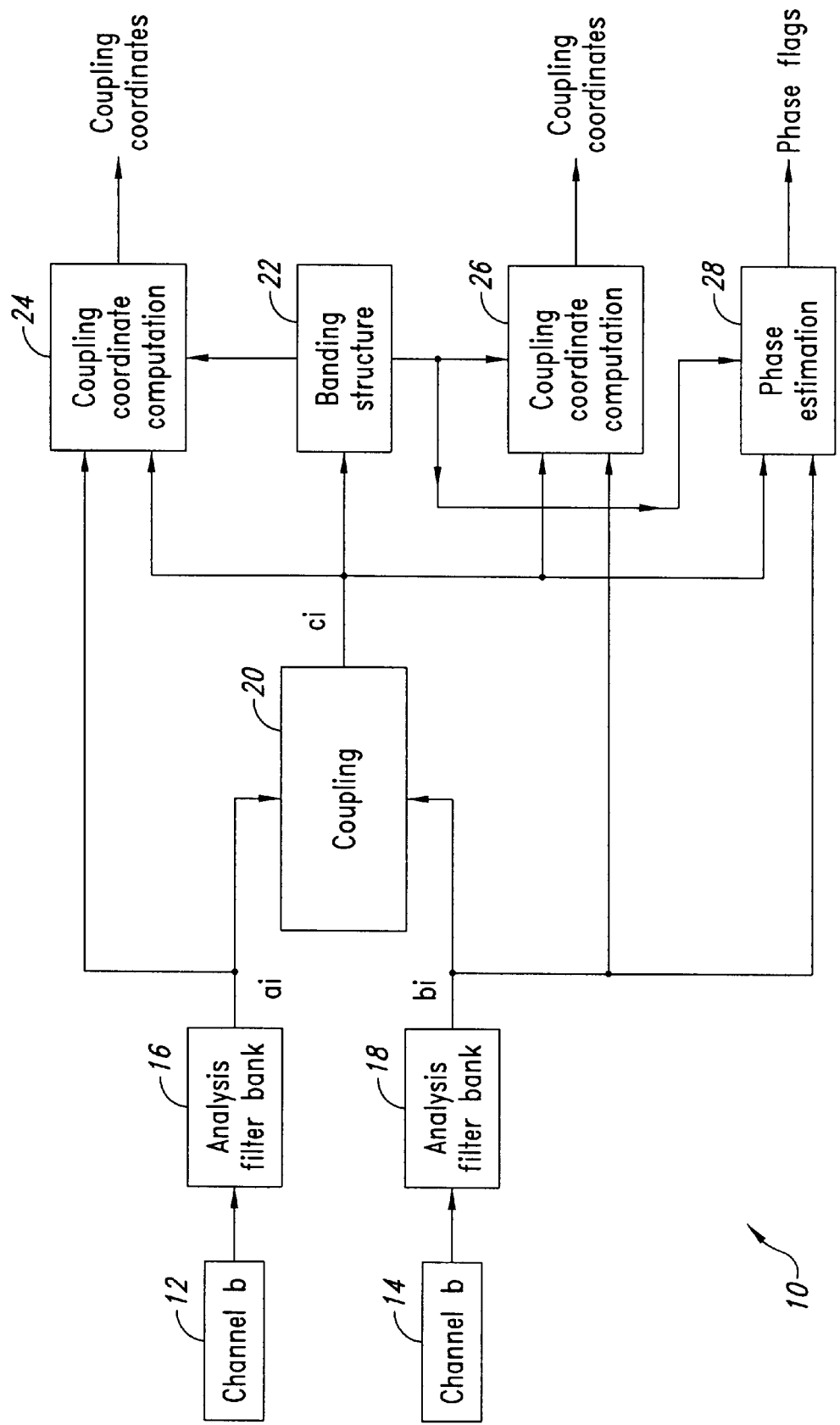
FIG. 3 is a block diagram of a dual channel audio encoder apparatus constructed according to an embodiment of the invention.

FIG. 3 is a block diagram showing a dual channel audio encoder apparatus 10 for implementing this coupling parameter determination method. The encoder 10 receives PCM coded audio samples corresponding to left and right audio channels referred to as channel a (12) and channel b (14), respectively. The audio data from channels a and b are passed to respective analysis filter banks 16, 18 of conventional form, which transform the audio data into frequency domain transform coefficients $a_i$ and $b_i$. The transform coefficients are passed to a coupling processor 20 which generates coupling channel coefficients $c_i$.

The encoder 10 includes a coupling band structure determination processor 22, which determines how the sub-bands are structured into bands in the coupling channel according to the above described method based on the computed power in each sub-band and the resulting coupling strategy (Eq. 2 or Eq. 3) which is used. The banding structure processor 22 controls left and right channel coupling coordinate computation processors 24, 26 so as to generate left and right coupling coordinates for each band. The coupling coordinate computation processors receive as input the coupling channel coefficients $c_i$ and the respective left or right channel transform coefficients $a_i$, $b_i$, and generate respective channel coupling coordinates according to the coupling band structure dictated by the banding structure processor 22.

A phase estimation processor 28 is also provided that receives as input the coupling channel coefficients $c_i$ and the right channel coefficients $b_i$. The phase estimation processor 28 is also controlled by the banding structure processor 22 so that the phase flags generated thereby correspond to the predefined frequency bands of the channel coupling coordinates. For each coupling channel frequency band the phase estimation processor generates a corresponding phase flag according to the coupling strategy used for that band, as described above. The phase flags are output to be included in the encoded bit stream along with the coupling channel coefficients $c_i$, and the left and right channel coupling coordinates.

The dual channel audio encoder apparatus 10 is preferably implemented as part of an application specific integrated circuit, in which case the functional blocks described above may comprise circuit portions that interact with one another under control of timing and control circuitry. Alternatively, however, the encoder apparatus may be implemented by a more general purpose data processing circuit such as a conventional microprocessor, and in that case the functions performed by the individual functional blocks as above described may all be performed by the same microprocessor circuit according to instructions defining the functions which are stored as, for example, micro-code.

Figure 4A:
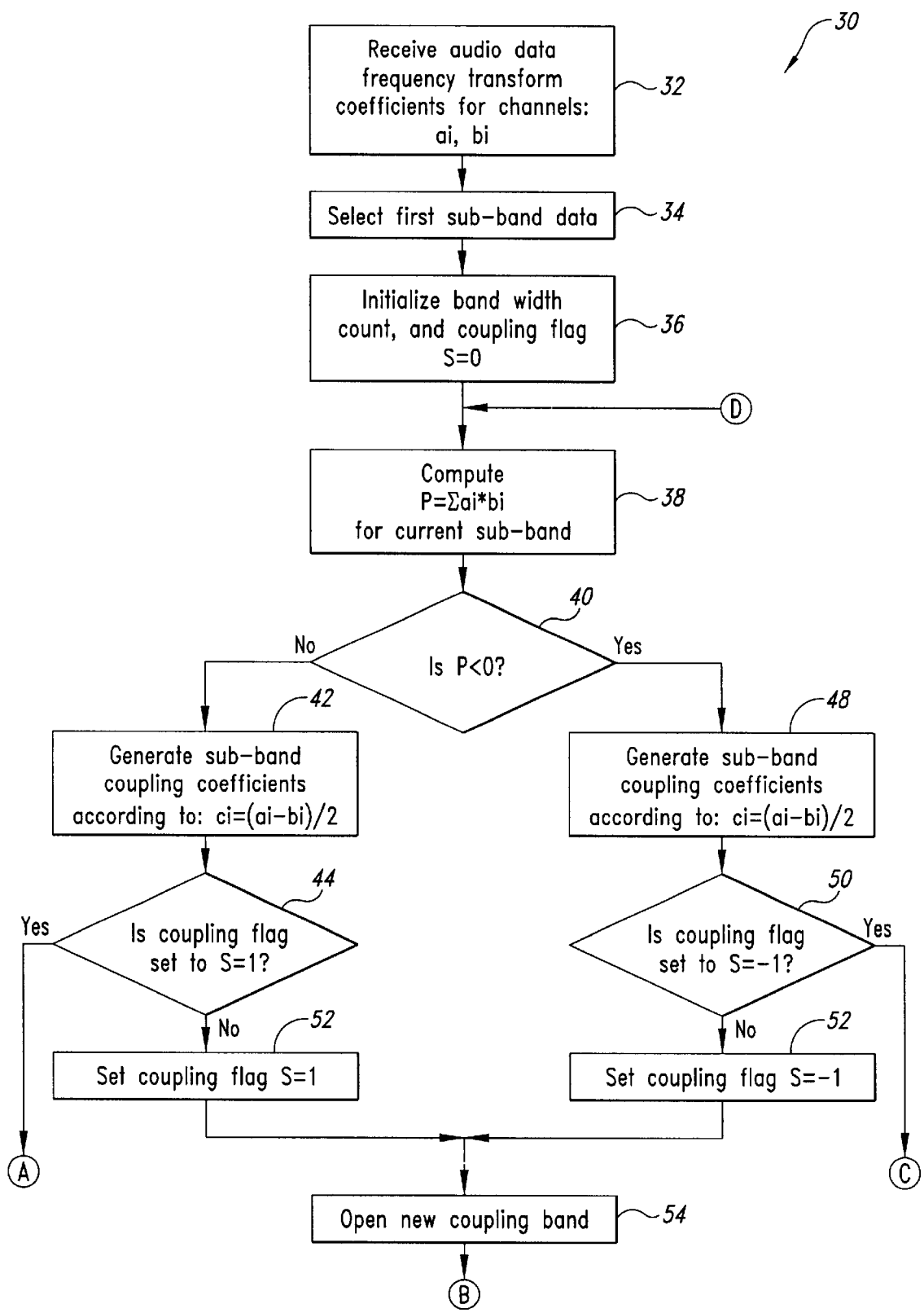
FIG. 4 is a flow-chart diagram of a procedure for generating coupling coefficients and phase flags according to a preferred embodiment of the invention.
Figure 4B:
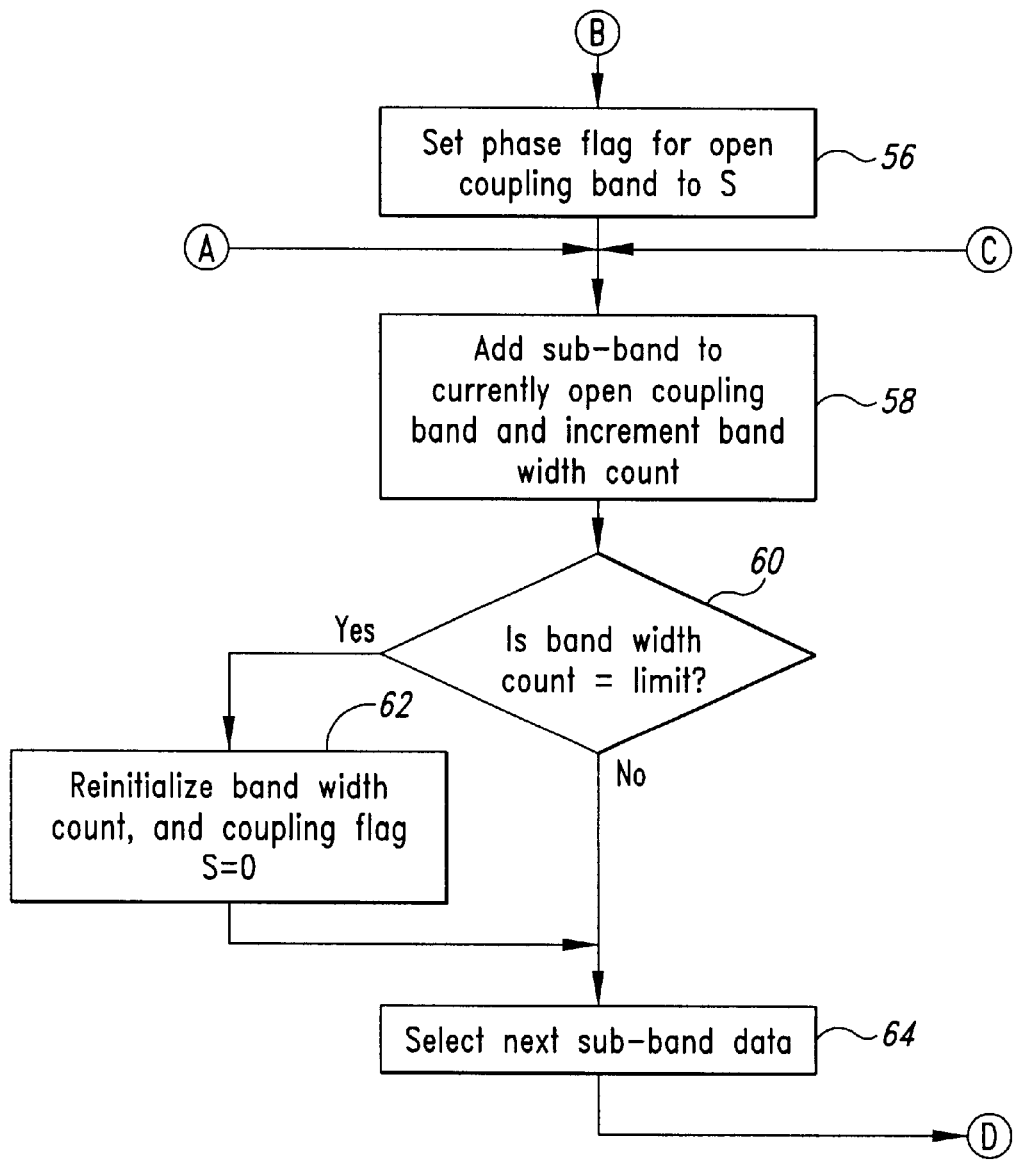

FIG. 4 is a flow-chart diagram of a procedure 30 for generating coupling coefficients and phase flags according to a preferred embodiment of the invention. The procedure 30 begins with step 32 where audio data frequency transform coefficients for the left and right channels ($a_i$, $b_i$) are received. From this data frequency transform coefficients for a first sub-band are selected at step 34. Also (step 36), a band width count, representing the number of sub-bands forming a coupling channel band, is initialized (e.g. set to zero), and a coupling flag S is also initialized to zero. The coupling flag S is capable of taking on the values 0, +1 and −1.

A power value P is then computed at step 38 for the first sub-band of the audio data, by determining a correlation between coefficients of the left and right channels in the sub-band, using $P=\Sigma_i(a_i*b_i)$.

If the power value, P, is determined to be a positive value at step 40, then the procedure passes to step 42 where a coupling coefficient $c_i$ is computed according to a first coupling strategy, wherein $c_i=(a_i+b_i)/2$. Following step 42, the procedure 30 examines the value of the coupling flag S to determine if the coupling flag is set to S=+1. If it is then that is an indication that coupling coefficients in the currently open coupling band have also been computed using the first coupling strategy. In this case, the procedure passes to step 58 where the sub-band is added to the currently open coupling band, and the band width count is incremented.

Similarly, if the power value, P, is determined to be a negative value at step 40, then the procedure passes to step 48 where a coupling coefficient $c_i$ is computed according to a second coupling strategy, wherein $c_i=(a_i-b_i)/2$. The procedure 30 then examines the value of the coupling flag S (step 50) to determine if the coupling flag is set to S=−1, and if so then the procedure passes to step 58 where the sub-band is added to the currently open coupling band, and the band width count is incremented.

In the event that the test of the coupling flag S is found to be not true at step 44 or 50, the procedure passes to step 46 or 52, respectively, where the coupling flag is set accordingly. In this case the current coupling band is no longer valid, which can be because i) there is no coupling band open because the procedure has only just begun and the first sub-band is being processed; ii) the current coupling band contains sub-band coupling coefficients computed using the other coupling strategy; or iii) the current coupling band has reached the band width limit. Therefore, a new coupling band is opened (step 54) to which to add the current sub-band to. The phase flag for the new coupling band is set equal to the coupling flag S, which was set to the corresponding correct value at step 46 or 52.

Following step 56, the procedure 30 continues to step 58 where the sub-band is added to the just opened coupling band, and the band width count for that coupling band is incremented. The value of the band width count is examined at step 60. If the band width count has not reached its limit, then the next sub-band data is selected from the audio data frequency transform coefficients at step 64, before the procedure returns to step 38. Otherwise, if the band width limit has been reached for the current coupling band, the band width count is reset and the coupling flag set to S=0, before the procedure continues to step 64. By setting the coupling flag to S=0, the procedure is caused to open a new coupling band during the next iteration by virtue of steps 44, 50 and step 54.

This series of steps (38 to 64) is then carried out for all of the remaining frequency coefficients in the audio data for which coupling is applicable.

The foregoing detailed description of embodiments of the invention has been presented by way of example only, and this description is not intended to be considered limiting to the invention as defined in the claims appended hereto and the equivalents thereof.

What is claimed is:

1. A method for computing coupling parameters in a digital audio encoder wherein frequency coefficient sub-bands in a coupling frequency range are arranged into coupling bands, comprising the steps of: determining a power value for each sub-band in the frequency range, selecting a coupling scheme for each sub-band based on the corresponding power value, and grouping adjacent sub-bands having the same selected coupling scheme into coupling bands.

2. The method of claim 1, comprising determining coupling coefficients according to a first or second selected coupling scheme.

3. The method of claim 2, wherein the first or second coupling scheme is selected for each sub-band according to whether the power value is positive or negative.

4. The method of claim 1, wherein each sub-band includes at least one frequency coefficient from each of first and second audio channels, and wherein the power value for a particular sub-band is determined by summing a product of corresponding frequency coefficients from the first and second channels.

5. The method of claim 1, wherein the power value for each sub-band is determined by a correlation computation of frequency coefficients from first and second audio channels.

6. The method of claim 1, comprising determining a phase reconstruction value for each coupling band on the basis of the coupling scheme selected for the sub-bands in that band.

7. A method for generating coupling parameters in a dual channel audio encoder wherein frequency coefficient sub-bands in a coupling frequency range are arranged into coupling bands, each sub-band including at least one frequency coefficient from each of first and second audio channels, the method comprising the steps of:
   i) receiving frequency transform coefficients for the first and second audio channels;
   ii) computing a power value for each sub-band;
   iii) for each sub-band, selecting a coupling coefficient generation scheme from first and second schemes on the basis of the computed power value for that sub-band;
   iv) for each sub-band, generating at least one coupling coefficient according to the selected one of the first and second schemes for that sub-band; and
   v) forming bands from adjacent sub-bands having the same selected scheme.

8. The method of claim 7, wherein the power value for each sub-band is computed by calculating a correlation of frequency transform coefficients from the first and second audio channels.

9. The method of claim 7, wherein the power value for a said sub-band u computed according to:

$$P=\Sigma_i(a_i*b_i)$$

where
   P is the power value,
   $a_i$ are frequency coefficients from the first audio channel,
   $b_i$ are frequency coefficients from the second audio channel, and
   index i corresponds to frequency coefficients extending over the range of the said sub-band.

10. The method of claim 9, wherein the coupling coefficient generation scheme is selected on the basis of whether the power value, P, is greater or less than zero.

11. The method of claim 10, wherein when the power value, P, is greater than zero the coupling coefficients for the sub-band are generated according to:

$$c_i=(a_i+b_i)/2$$

where $c_i$ are the coupling coefficients; and when the power value, P, is less than zero the coupling coefficients for the sub-band are generated according to:

$$c_i=(a_i-b_i)/2.$$

12. The method of claim 7, comprising generating a phase flag for a said coupling band on the basis of the power value or coupling coefficient generation scheme for the sub-bands in that coupling band.

13. The method of claim 12, wherein the phase flag for a particular coupling band is +1 if the power value, P, for each of the constituent sub-bands is greater than zero, and the phase flag is −1 if the power value, P, for each of the constituent sub-bands is less than zero.

14. A method for computing coupling parameters in a digital audio encoder wherein frequency coefficient sub-bands in a coupling frequency range are arranged into coupling bands, comprising the steps of:

receiving audio data frequency transform coefficients for first and second channels;

selecting first sub-band frequency data for each of the first and second channels;

initializing bandwidth count, and setting a coupling flag to zero;

computing for the current sub-band frequency the power value P by determining a correlation between coefficients of the first and second channels in the sub-band frequency according to:

$$P=\Sigma_i(a_i * b_i)$$

where

P is the computed power value;

$a_i$ is the audio data frequency transform coefficient for the first channel;

$b_i$ is the audio data frequency transform coefficient for the second channel;

when P<0, generating sub-band frequency coupling coefficients according to $C_i=(a_i+b_i)/2$, and when P>0, generating sub-band frequency coupling coefficients according $C_i=(a_i-b_i)/2$;

when the coupling flag is not set to zero, opening a new coupling band and setting a phase flag for open coupling band to the coupling flag value, and adding the sub-band frequency data to the currently opened coupling band;

when the bandwidth count does not equal a bandwidth limit, selecting a next sub-band frequency data, otherwise first reinitializing the bandwidth count and the coupling flag to zero then selecting the next sub-band frequency data; and returning to compute the power value and repeating the method therefrom.

15. The method of claim 14, wherein the step of determining when the coupling flag is not set to zero comprises when generating the sub-band frequency coupling coefficients according to $C_i=(a_i+b_i)/2$, determining if the coupling flag is set to 1; and when the coupling flag is set to 1, proceeding to the step of adding the sub-band frequency to the currently opened coupling band, and when the coupling flag is not set to 1, setting the coupling flag to 1, then opening the new coupling band and setting the phase flag for open coupling band to the coupling flag value of 1; and when generating the sub-band frequency coupling coefficients according to $C_i=(a_i-b_i)/2$, determining if the coupling flag is set to −1, and when the coupling flag is set to −1, proceeding to the step of adding the sub-band frequency to the currently open coupling band, and when the coupling flag is not set to −1, setting the coupling flag to −1 and then opening a new coupling band and setting the phase flag for the open coupling band to the value of the coupling flag of −1.

16. A dual channel digital audio encoding apparatus wherein audio data frequency coefficients for first and second channels in a coupling frequency range are arranged in a sequence of sub-bands, comprising:

a correlation computation processor for computing a power value for each sub-band;

a coupling coefficient generator for generating a sequence of sub-band coupling coefficients using a coupling coefficient generation scheme selected for each sub-band on the basis of the corresponding power value for that sub-band; and a band structure processor for arranging adjacent coupling coefficient sub-bands in the sequence generated with the same generation scheme into bands.

17. The dual channel digital audio encoding apparatus of claim 16, including a phase estimation processor for generating a phase flag for each band on the basis of the generation scheme used for the constituent sub-bands of the corresponding band.

18. The dual channel digital audio encoding apparatus of claim 16, including a coupling coordinate generator for generating coupling coordinates for the first and second channels for each said band.

19. A dual-channel digital audio apparatus for arranging audio data frequency coefficients for first and second channels in a coupling frequency range into a sequence of frequency sub-bands, comprising:

a correlation computation processor for computing a power value for each sub-band frequency by summing a product of corresponding frequency coefficients from the first and second channels;

a coupling coefficient generator configured to generate a sequence of sub-band frequency coupling coefficients using a coupling coefficient generation scheme selected for each sub-band frequency on the basis of the corresponding power value for that sub-band frequency; and a band structure processor configured for arranging adjacent coupling coefficient sub-band frequencies in the generated sequence having the same generation scheme into bands.

20. A dual-channel digital audio apparatus for arranging audio data frequency coefficients for first and second channels in a coupling frequency range into a sequence of frequency sub-bands, comprising:

a correlation computation processor for computing a power value for each sub-band frequency by summing a product of corresponding frequency coefficients from the first and second channels;

a coupling coefficient generator configured to generate a sequence of sub-band frequency coupling coefficients using a coupling coefficient generation scheme selected for each sub-band frequency on the basis of the corresponding power value for that sub-band frequency; and a band structure processor configured for arranging adjacent coupling coefficient sub-band frequencies in the generated sequence having the same generation scheme into bands and for determining a phase reconstruction value for each coupling band on the basis of the coupling scheme selected for the sub-band frequency in that band.

* * * * *